United States Patent
Di et al.

(10) Patent No.: US 11,783,972 B2
(45) Date of Patent: Oct. 10, 2023

(54) PREPARATION METHOD OF NEODYMIUM IRON BORON PRODUCTS AND NEODYMIUM IRON BORON PRODUCT PREPARED BY USING THE SAME

(71) Applicants: Hangzhou Magmax Technology Co., Ltd., Zhejiang (CN); Hangzhou Foresee Group Holding Co., Ltd., Zhejiang (CN)

(72) Inventors: Jinghui Di, Zhejiang (CN); Qifeng Wei, Zhejiang (CN); Shujun Shen, Zhejiang (CN); Shengli Jia, Zhejiang (CN); Lichun Zhan, Zhejiang (CN); Pengfei Ge, Zhejiang (CN)

(73) Assignees: Hangzhou Magmax Technology Co., Ltd., Hangzhou (CN); Hangzhou Foresee Group Holding Co., Ltd., Hangzhou (CN)

( * ) Notice: Subject to any disclaimer, the term of this patent is extended or adjusted under 35 U.S.C. 154(b) by 0 days.

(21) Appl. No.: 17/524,740

(22) Filed: Nov. 11, 2021

(65) Prior Publication Data

US 2023/0070437 A1 Mar. 9, 2023

(30) Foreign Application Priority Data

Aug. 27, 2021 (CN) .......................... 202110991842.8

(51) Int. Cl.
*H01F 1/057* (2006.01)
*H01F 41/02* (2006.01)
*H01F 41/22* (2006.01)

(52) U.S. Cl.
CPC ............. *H01F 1/057* (2013.01); *H01F 41/02* (2013.01); *H01F 41/22* (2013.01)

(58) Field of Classification Search
None
See application file for complete search history.

(56) References Cited

U.S. PATENT DOCUMENTS

| 11,335,483 | B2 * | 5/2022 | Tsubokura | ............ H01F 1/0577 |
| 2012/0182104 | A1 * | 7/2012 | Ozeki | ................. H01F 41/0266 419/30 |
| 2017/0213626 | A1 | 7/2017 | Paranthaman et al. | |
| 2022/0328244 | A1 * | 10/2022 | Yan | ..................... H01F 41/0293 |

FOREIGN PATENT DOCUMENTS

| CN | 106128672 A | * 11/2016 | ........... H01F 1/0573 |
| CN | 111383833 A | 7/2020 | |

OTHER PUBLICATIONS

Machine translation of CN 106128672A. (Year: 2016).*

* cited by examiner

*Primary Examiner* — Xiaowei Su

(57) ABSTRACT

The present application relates to a preparation method of neodymium iron boron products and the neodymium iron boron product prepared by using the same. The preparation method of neodymium iron boron products includes the following steps: Step S1: preparing blank magnet; Step S2: obtaining preprocessed sheets; Step S3: surface treating; Step S4: heavy rare earth coating; Step S5: stacking: stacking a plurality of preprocessed sheets to give stacked magnets; and Step S6: grain boundary diffusion: successively subjecting the stacked magnets to a primary heat treatment for 2-40 min, a secondary heat treatment at 700-1000° C. for 4-40 h, and then tempering at 450-700° C., in which the primary heat treatment is induction heat treatment or electric spark sintering.

8 Claims, No Drawings

PREPARATION METHOD OF NEODYMIUM IRON BORON PRODUCTS AND NEODYMIUM IRON BORON PRODUCT PREPARED BY USING THE SAME

CROSS-REFERENCE TO RELATED APPLICATION

This application claims the priority and benefit of Chinese patent application serial no. 202110991842.8, filed on Aug. 27, 2021. The entirety of the above-mentioned patent application is hereby incorporated by reference herein and made a part of this specification.

TECHNICAL FIELD

The present application relates to the field of neodymium iron boron products, and in particular to a preparation method of neodymium iron boron products and a neodymium iron boron product prepared by using the same.

BACKGROUND ART

Neodymium iron boron material, also known as neodymium iron boron magnet, is composed of tetragonal $Nd_2Fe_{14}B$ crystal as main phase, and is the most widely used rare earth magnet. It is widely used in consumer electronics, such as hard disks, mobile phones, headsets and battery powered tools.

Neodymium iron boron material has excellent properties. At present, neodymium iron boron material is often used in high-temperature environment, and the performance thereof under high-temperature conditions is very important. The high-temperature performance of neodymium iron boron material is improved by the grain boundary diffusion (GBD) technology of heavy rare earths. During the GBD process, the heavy rare earths such as Dy and Tb in the form of metals, alloys and compounds are applied on the surface of the magnet so as to diffuse the heavy rare earths through the grain boundary into the interior of the magnet under high-temperature heat treatment. The coercivity of the magnet is enhanced by the high magnetic anisotropy field of Dy/Tb-containing matrix shells, while the remanence is almost not deteriorated.

However, the grain boundary diffusion technology is limited by the diffusivity of heavy rare earth. For large thickness magnet with a thickness greater than 8 mm, the diffusion effect is poor, rendering it difficult to apply the grain boundary diffusion technology to large thickness magnets. In view of the above problems, after attaching heavy rare earths on the surface of small thickness (less than 8 mm) neodymium iron boron single sheet, the laminated blank is obtained by gapless stacking, then the heavy rare earths diffuse, and the neodymium iron boron single sheets are weld to give a neodymium iron boron material with larger thickness.

For the neodymium iron boron magnet obtained in the above related technologies, the welding strength between adjacent neodymium iron boron single sheets is insufficient, resulting in overall poor mechanical properties and poor service properties of the neodymium iron boron magnet, which hinders the application of the product.

SUMMARY

In order to improve the welding strength between neodymium iron boron single sheets, and in turn improve the overall mechanical properties and service properties thereof, this application provides a preparation method of a neodymium iron boron product.

In a first aspect, the present application provides the following technical solution: a preparation method of neodymium iron boron products, including the following steps:

Step S1: preparing a blank magnet;

Step S2: obtaining preprocessed sheets: forming a group of welding surface from two opposite sides of the blank magnets, in which there are at least one group of welding surface, the side of the blank magnet acts as a welding surface, and the distance between two welding surfaces in each group of welding surface is 0.2-12 mm; and magnetizing the blank magnet in a direction forming an angle relative to the welding surface to obtain the preprocessed sheets;

Step S3: surface treating: cleaning the preprocessed sheets;

Step S4: heavy rare earth coating: after surface treating, coating a heavy rare earth containing layer on the welding surface of the preprocessed sheet. The heavy rare earth containing layer can be one selected form the group consisting of heavy rare earth metals, heavy rare earth alloys and heavy rare earth compounds;

Step S5: stacking: stacking a plurality of preprocessed sheets to obtain stacked magnets, in which there is at least one heavy rare earth containing layer between adjacent preprocessed sheets; and Step S6: grain boundary diffusion: successively subjecting the stacked magnets to a primary heat treatment for 2-40 min, a secondary heat treatment at 700-1000° C. for 4-40 h, and then tempering at 450-700° C., in which the primary heat treatment is one selected from the group consisting of induction heat treatment and electric spark sintering.

In the above technical solutions, the blank magnet is purchased or self-made, a plurality of blank magnets, after coating with heavy rare earth containing layers, are stacked to give sets of magnets greater than 8 mm under the grain boundary diffusion treatment, so that large-size magnet products can be produced by grain boundary diffusion technology. Such a technical solution adopts the diffusion step of primary heat treatment, then heat treatment again and final tempering. In addition, an induction heat treatment or electric spark sintering is specifically used in the heat treatment. In particular, the induction heat treatment is a surface heat treatment process for locally heating the workpiece by the induced current; and the electric spark sintering is a sintering method which performs sintering at the high temperature produced by spark discharge between powders while subjecting to an external stress. In addition, this technical solution is applicable to the welding of blank magnets with a single sheet thickness of 0.5-12 mm. It can be seen from the test that, it can not only improve the coercivity, remanence and squareness of neodymium iron boron products made of 0.2-8 mm blank magnets, but also realize the diffusion to blank magnets with a thickness of 8-12 mm, thus forming even larger thickness (over 12 mm) of the magnet.

The above technical solution greatly improves the welding strength between blank magnets, and can slightly improve the coercivity, remanence and squareness of magnets. At the same time, it is also found that it can greatly improve the anti-demagnetization capability of magnets.

In the process of heat treatment, heavy rare earth diffuses along the grain boundary to the interior of pairs of magnets it contacts. In the diffusion process, the rare earth enhances the effect of liquid phase mass transfer and achieves a good welding effect.

Further, in Step S6, the stacked magnet is subjected to a secondary heat treatment under a pressure of 2-50 MPa.

In the above technical solution, it can be seen from the test that, in combination with pressurization, the coercivity and remanence of the magnet can be improved, and the anti-demagnetization capability and welding strength of the magnet can be further improved.

Further, in Step S6, a later stage of the primary heat treatment accounting for 10-50% of the total time of the primary heat treatment is carried out under a pressure of 2-50 MPa.

In the above technical solution, It can be seen from the test that, in combination with pressurization, the coercivity, remanence and squareness of the magnet can be stabilized and improved, and the anti-demagnetization capability and welding strength of the magnet can be further improved.

Further, the pressurization treatment in Step S6 is pressurization in an atmosphere of 2-30 MPa.

In the above technical solution, nitrogen or inert gas is generally selected for atmosphere pressurization, which is combined with high temperature to achieve heat treatment, improving the efficiency of surface heating. It can be seen from the test that, the remanence, coercivity and squareness of the magnets can be slightly improved.

Further, the induction heat treatment frequency is 1.9-3 kHz.

In the above technical solution, on the basis of induction heat treatment, the current is further refined to a medium frequency band. It can be seen from the test that, the positive effect on magnet performance, welding strength and anti-demagnetization capability can be further achieved in a small extent on the basis of stabilizing the squareness.

Further, in Step S6, during the primary heat treatment, the heating mode of stacked magnets is transverse flux heating.

In the above technical solution, when performing the transverse flux heating, the welding surface is perpendicular to the direction of the induced magnetic field, which, cooperated with the medium frequency, achieves a better heating effect on the magnet with a small thickness, so as to improve the uniformity of surface heating. It can be seen from the test that, the positive effect on coercivity and remanence of the magnet can be further achieved on the basis of stabilizing squareness, and the anti-demagnetization capability of the magnet can also be improved at the same time.

Further, in Step S2, the area of a single welding surface of the blank magnet is 0.3-4000 $mm^2$.

In the above technical solution, the difficulty of operation due to too small welding surface of blank magnet is avoided, ensuring the firmness of the welding.

Further, in Step S6, the secondary heat treatment temperature is 820-1000° C. and the tempering temperature is 480-600° C.

In the above technical solution, it can be seen from the test that, after further refining the heat treatment temperature and tempering temperature, the heat treatment effect can be improved, and the coercivity, remanence and squareness of the magnet can be improved on the basis of stabilizing the squareness.

Further, when the primary heat treatment is electric spark sintering, the sintering temperature is 600-850° C., the current is 1000-5000 A and the voltage is 5-15 V.

In the above technical solution, it can be seen from the test that the electric spark sintering process within such parameters can improve the coercivity, remanence and squareness of the magnet.

In a second aspect, the present application provides the following technical solution: a neodymium iron boron product, which is prepared by the above preparation method.

In the above technical solution, a neodymium iron boron product with excellent coercivity, remanence and squareness and excellent anti-demagnetization capability can be obtained.

In summary, this application has the following beneficial effects.

1. In this application, primary heat treatment, secondary heat treatment and tempering are preferably used, and the primary heat treatment is induction heat treatment or electric spark sintering, which can slightly improve the coercivity, remanence and squareness of the magnet, improve the welding strength between blank magnets, and greatly improve the anti-demagnetization capability of the magnet.

2. In this application, it is preferred to cooperate with the pressurization treatment in Step S6, which can further improve the coercivity, remanence and squareness of the magnet, and further improve the anti-demagnetization capability and welding strength of the magnet.

3. In this application, it is preferable to refine the frequency of induction heat treatment and cooperate with transverse flux heating to further achieve a positive effect on the coercivity, remanence and squareness of the magnet.

DETAILED DESCRIPTION

Example

Example 1: a preparation method of neodymium iron boron products, including the following steps:
- Step S1: obtaining a blank magnet prepared by powder metallurgy method: a magnet with brand N52M was available from Hangzhou Magmax Technology Co., Ltd;
- Step S2: obtaining preprocessed sheets: machining the blank magnet to a size of 20 mm*28 mm*6 mm to give the preprocessed sheets, and marking as ① and ② respectively, in which the surface of 20 mm*28 mm is the welding surface;
- Step S3: surface treatment: placing the preprocessed sheets into nitric acid aqueous solution with a nitric acid concentration of 2.5%, and performing ultrasonic cleaning for 10 min under the condition of ultrasonic cleaning frequency of 50 kHz, to complete oil removing and acid cleaning;
- Step S4: heavy rare earth coating: after surface treatment, coating Tb on two welding surfaces of ① and one welding surface of ② by magnetron sputtering to form Tb films with a thickness of 15 μm (heavy rare earth containing layer), in which magnetron sputtering process parameters includes: argon pressure 0.02 Torr, voltage 1000 V, and current 0.1 A;
- Step S5: stacking: staking two preprocessed sheets ① and ② to give the stacked magnet, in which the welding surface of ② without heavy rare earth containing layer and the welding surface of ① coated with heavy rare earth containing layer contact each other; and
- Step S6: grain boundary diffusion: fixing the stacked magnets in a hot pressing furnace and performing induction heat treatment at a frequency of 200 Hz for 15 min; then transferring the stacked magnets to a diffusion furnace and performing a secondary heat treatment at 810° C. for 20 h; and then transferring to a tempering furnace and performing tempering at 450° C. for 3 h, to give neodymium iron boron products, in which the welding surfaces are parallel to the magnetic field direction of induction coils during induction heat treatment.

Before use, the hot-pressing furnace, the diffusion furnace and the tempering furnace were vacuumed with an air pump, and then introduced with argon to protect the magnets.

Example 2: a preparation method of neodymium iron boron products, including the following steps:

Step S1: obtaining the blank magnet prepared by a powder metallurgy method: a magnet with brand N54SH was available from Hangzhou Magmax Technology Co., Ltd;

Step S2: obtaining preprocessed sheets: machining the blank magnet into four ¼ circular rings with a inner diameter of 4 mm, a outer diameter of 10 mm and a thickness of 8 mm, and marking as ①, ②, ③ and ④ respectively, in which the surface of 6 mm*8 mm is the welding surface;

Step S3: surface treatment: placing the preprocessed sheets into nitric acid aqueous solution with a nitric acid concentration of 2.5%, and performing ultrasonic cleaning for 8 min under the condition of ultrasonic cleaning frequency of 60 kHz, to complete oil removing and acid cleaning;

Step S4: heavy rare earth coating: after surface treatment, coating terbium on one welding surface of ①, ②, ③ and ④ by magnetron sputtering to form Tb films with a thickness of 30 μm (heavy rare earth containing layer), in which magnetron sputtering process parameters includes: argon pressure 0.02 Torr, voltage 1000 V, and current 0.1 A;

Step S5: stacking: sequentially fitting the welding surfaces of ①, ②, ③ and ④ by the way that the welding surface coated with heavy rare earth containing layer of ① faced the welding surface without heavy rare earth containing layer of ②, the welding surface coated with heavy rare earth containing layer of ② faced the welding surface without heavy rare earth containing layer of ③, the welding surface coated with heavy rare earth containing layer of ③ faced the welding surface without heavy rare earth containing layer of ④, and the welding surface coated with heavy rare earth containing layer of ④ faced the welding surface coated with heavy rare earth containing layer of ①, to obtain a stacked ring magnet; and Step S6: grain boundary diffusion: fixing the stacked magnets in the hot pressing furnace and performing a primary heat treatment at an induction heat treatment frequency of 50 Hz for 2 min; and then transferring to the diffusion furnace and performing a heat treatment at 1000° C. for 40 h; then performing tempering at 510° C. for 6 h, to give neodymium iron boron products, in which the welding surfaces are parallel to the magnetic field direction of the induction coils during the induction heat treatment.

Before use, the electric spark sintering machine, the diffusion furnace and the tempering furnace were introduced with argon to evacuate air thereinside, so as to protect the magnets.

Example 3: a preparation method of neodymium iron boron products, including the following steps:

Step S1: obtaining the blank magnet prepared by powder metallurgy method: obtaining five magnets with brand N50SH from Hangzhou Magmax Technology Co., Ltd, and marking as ①, ②, ③, ④ and ⑤ respectively;

Step S2: obtaining preprocessed sheets: machining the blank magnets to a size of 10 mm*12 mm*3 mm to give the preprocessed sheet, in which the surface of 10 mm*12 mm is the welding surface;

Step S3: surface treatment: placing the preprocessed sheets into nitric acid aqueous solution with a nitric acid concentration of 3%, and performing ultrasonic cleaning for 3 min under the condition of ultrasonic cleaning frequency of 70 kHz to complete oil removing and acid cleaning;

Step S4: heavy rare earth coating: after surface treatment, coating dysprosium on two welding surfaces of ①, ②, ③, ④ and ⑤ by magnetron sputtering to form dysprosium films with a thickness of 6 μm (heavy rare earth containing layer), in which magnetron sputtering process parameters includes: argon pressure 0.02 Torr, voltage 1000 V, and current 0.1 A;

Step S5: stacking: stacking ① and ② to give the stacked magnets; and

Step S6: grain boundary diffusion: fixing the stacked magnets in an electric spark sintering machine, and sintering for 2 min, in which the process parameters of electric spark sintering includes: voltage 5V, current 2000 A, sintering temperature 600° C., and pressure 3 MPa; then transferring to the diffusion furnace and performing a secondary heat treatment at 700° C. for 40 h; and then transferring to the tempering furnace and performing tempering at 510° C. for 6 h to give neodymium iron boron products, in which the welding surfaces are parallel to the magnetic field direction of the induction coil during the induction heat treatment.

Before use, the hot-pressing furnace, the diffusion furnace and the tempering furnace were introduced with argon to evacuate the air thereinside, so as to protect the magnets.

Example 4: a preparation method of neodymium iron boron products, which was different from example 1 in that:

in step S4: terbium was coated on the two welding surfaces of ① and ②; and, in Step S6, after being transferred to the diffusion furnace, a secondary heat treatment was carried out at a temperature of 700° C., in which thickness of the heavy rare earth containing layer was 1 μm.

Example 5: a preparation method of neodymium iron boron products, which was different from example 1 in that:

in Step S2: the blank magnet was machined to five preprocessed sheets with a size of 20 mm*28 mm*0.2 mm, and marked as ①, ②, ③, ④ and ⑤ respectively, in which the surface of 20 mm*28 mm was the welding surface; and in Step S4: both welding surfaces of ①, ②, ③, ④ and ⑤ were coated with heavy rare earth containing layers during the heavy rare earth coating.

Example 6: a preparation method of neodymium iron boron products, which was different from example 1 in that:

in Step S2: the blank magnet was machined to two preprocessed sheets with a size of 20 mm*28 mm*8 mm, and marked as ① and ② respectively, in which the surface of 20 mm*28 mm was the welding surface, and the thickness of the heavy rare earth containing layer was 18 μm; and in Step S4: both welding surfaces of ① and ② were coated with heavy rare earth containing layers during heavy rare earth coating.

Example 7: a preparation method of neodymium iron boron products, which was different from example 1 in that:

in Step S2: the blank magnet was machined to two preprocessed sheets with a size of 20 mm*28 mm*12 mm, and marked as ①  and ② respectively, in which the surface of 20 mm*28 mm was the welding surface; and in Step S4: both welding surfaces of ① and ② were coated with heavy rare earth containing layers during the heavy rare earth coating.

Example 8: a preparation method of neodymium iron boron products, which was different from example 1 in that: in Step S6, 1.12 kg iron block was pressed onto the 20 mm*28 mm surface of the stacked magnet during the secondary heat treatment.

Example 9: a preparation method of neodymium iron boron products, which was different from example 1 in that: in Step S6, after transferring the stacked magnet to the diffusion furnace, argon was first introduced into the diffusion furnace until the pressure in the furnace reached 10 MPa, and the secondary heat treatment was carried out at 810° C. for 40 h.

Example 10: a preparation method of neodymium iron boron products, which was different from example 1 in that: in Step S6, after transferring the stacked magnet to the diffusion furnace, argon was first introduced into the diffusion furnace until the pressure in the furnace reached 30 MPa, and the secondary heat treatment was carried out at 810° C. for 40 h.

Example 11: a preparation method of neodymium iron boron products, which was different from example 1 in that: in Step S6, after placing the stacked magnet into the hot pressing furnace, argon was first introduced into the diffusion furnace until the pressure in the furnace reaches 30 MPa, and then induction heat treatment was carried out.

Example 12: a preparation method of neodymium iron boron products, which was different from example 9 in that: in Step S6, after placing the stacked magnets into the hot pressing furnace, argon was first introduced into the diffusion furnace until the pressure in the furnace reached 10 MPa, and then induction heat treatment was carried out.

Example 13: a preparation method of neodymium iron boron products, which was different from example 9 in that: in Step S6, after placing the stacked magnet into the hot pressing furnace, induction heat treatment was carried out for after 7.5 min, 1.12 kg iron block was pressed onto the stacked magnet, and then the induction heat treatment was continued.

Example 14: a preparation method of neodymium iron boron products, which was different from example 9 in that: in Step S6, after placing the stacked magnets into the hot pressing furnace, induction heat treatment was carried out for 13.5 min, argon was introduced into the diffusion furnace until the pressure in the furnace reached 10 MPa, and induction heat treatment was continued.

Example 15: a preparation method of neodymium iron boron products, which was different from example 14 in that: in Step S6, the induction heat treatment frequency was 1.9 khz.

Example 16: a preparation method of neodymium iron boron products, which was different from example 14 in that: in Step S6, the induction heat treatment frequency was 2.3 khz.

Example 17: a preparation method of neodymium iron boron products, which was different from example 14 in that: in Step S6, the induction heat treatment frequency was 3 kHz.

Example 18: a preparation method of neodymium iron boron products, which was different from example 16 in that: in Step S6, transverse flux heating was carried out during the induction heat treatment, in which the welding surface was perpendicular to the magnetic field direction of the induction coil.

Example 19: a preparation method of neodymium iron boron products, which was different from example 1 in that: in Step S6, transverse flux heating was carried out during the induction heat treatment, in which the welding surface was perpendicular to the magnetic field direction of the induction coil.

Example 20: a preparation method of neodymium iron boron products, which was different from example 18 in that: in Step S6, the secondary heat treatment temperature was 820° C., and the treatment time was 30 h; the tempering temperature was 480° C. and the tempering time was 3 h.

Example 21: a preparation method of neodymium iron boron products, which was different from example 18 in that: in Step S6, the secondary heat treatment temperature was 1000° C. and the treatment time was 20 h; the tempering temperature was 600° C. and the tempering time was 2.5 h.

Example 22: a preparation method of neodymium iron boron products, which was different from example 3 in that: in Step S6, the parameters of electric spark sintering were: voltage 8 V, current 3500 A, sintering temperature 720° C., and pressure 20 MPa.

Example 23: a preparation method of neodymium iron boron products, which was different from example 3 in that: in Step S6, the parameters of electric spark sintering were: voltage 10 V, current 4100 A, sintering temperature 850° C., and pressure 6 MPa.

Example 24: a preparation method of neodymium iron boron products, which was different from example 3 in that: in Step S6, the parameters of electric spark sintering were: voltage 15 V, current 5000 A, sintering temperature 620° C., and pressure 50 MPa.

Example 25: a preparation method of neodymium iron boron products, which was different from example 1 in that: in Step S2, the blank magnet was machined to a size of 0.5 mm*0.4 mm*1 mm, and marked as ①, ② respectively, to give the preprocessed sheets, in which the surface of 0.5 mm*0.4 mm was the welding surface.

Example 26: a preparation method of neodymium iron boron products, which was different from example 1 in that: in Step S2, the blank magnet was machined to a size of 50 mm*80 mm*10 mm, and marked as ①, ② respectively, to give the preprocessed sheets, in which the surface of 50 mm*80 mm was the welding surface.

Comparative Examples

Comparative example 1: a preparation method of neodymium iron boron products, which was different from example 1 in that: in Step S6, the stacked magnets were put into the diffusion furnace, heat treated at 850° C. for 20 h under 1atm condition, and then transferred to the tempering furnace for tempering.

Comparative example 2: a preparation method of neodymium iron boron products, which was different from example 1 in that: in Step S2, the blank magnet was machined to a size of 20 mm*28 mm*12 mm; and, in Step S6, the stacked magnets were placed into the diffusion furnace, heat treated at 850° C. for 20 h under 1 atm condition, and then transferred to the tempering furnace for tempering.

Comparative example 3: a preparation method of neodymium iron boron products, which was different from example 1 in that: in Step S6, the secondary heat treatment was directly carried out without the primary heat treatment.

Comparative example 4: a preparation method of neodymium iron boron products, which was different from example 1 in that: in Step S6, the primary heat treatment was carry out in a diffusion furnace, at a temperature of 760° C. for 15 min.

Comparative example 5: a preparation method of neodymium iron boron products, which was different from example 2 in that: in Step S6, the stacked magnets were placed into the diffusion furnace, heat treated at 850° C. for 20 h at 1 atm condition, and then transferred to the tempering furnace for tempering.

Comparative example 6: a preparation method of neodymium iron boron products, which was different from example 3 in that: in Step S6, the stacked magnet was put into the diffusion furnace, heat treated at 850° C. for 20 h at 1 atm condition, and then transferred to the tempering furnace for tempering.

Characterization Tests:

1. Basic Performance Test

Test object: the neodymium iron boron products obtained in examples 1-26 and comparative examples 1-6, a total of 30 groups of test samples.

Test method: the remanence (Br), coercivity (Hcj), maximum magnetic energy product ((BH) max) and squareness (Q) of the test samples were tested. The size of the test sample during the test was 1 mm width*5 mm length*5 mm height, of which 1 mm thickness was composed of adjacent single sheets, including the heavy rare earth containing layer. According to GB/T 3217-2013 permanent magnet (hard magnetic) materials—magnetic test method, the remanence (Br), coercivity (Hcj) and maximum magnetic energy product ((BH) max) of the test samples were tested, and the squareness (Q) was obtained as the ratio of knee-point coercivity Hk on the demagnetization curve to intrinsic coercivity Hcj.

Test results: the records of basic performance test results were shown in Table 1.

TABLE 1 records of basic performance test results

| Group | Br (kGs) | Hcj (kOe) | (BH) max (MGOe) | Q (%) |
|---|---|---|---|---|
| Group I ||||
| Example 1 | 14.18 | 24.50 | 48.18 | 97.3% |
| Example 4 | 14.17 | 24.59 | 48.20 | 97.6% |
| Example 5 | 14.17 | 24.52 | 48.18 | 97.5% |
| Example 6 | 14.16 | 24.64 | 48.21 | 97.3% |
| Example 7 | 14.04 | 18.43 | 46.12 | 80.1% |
| Example 8 | 14.20 | 25.17 | 48.50 | 98.7% |
| Example 9 | 14.19 | 25.08 | 48.41 | 99.0% |
| Example 10 | 14.20 | 25.20 | 48.58 | 98.8% |
| Example 11 | 14.18 | 25.11 | 48.59 | 98.9% |
| Example 12 | 14.23 | 25.67 | 48.65 | 98.8% |
| Example 13 | 14.25 | 25.86 | 48.73 | 99.0% |
| Example 14 | 14.24 | 25.82 | 48.71 | 98.8% |
| | | / | | |
| Example 15 | 14.29 | 26.10 | 48.86 | 99.0% |
| Example 16 | 14.31 | 26.22 | 49.02 | 99.2% |
| Example 17 | 14.29 | 26.18 | 48.94 | 98.9% |
| Example 18 | 14.33 | 26.93 | 49.27 | 99.3% |
| Example 19 | 14.20 | 24.42 | 48.21 | 97.9% |
| Example 20 | 14.33 | 26.95 | 49.29 | 99.1% |
| Example 21 | 14.32 | 26.94 | 49.27 | 99.2% |
| Example 25 | 14.15 | 24.51 | 48.17 | 97.6% |
| Example 26 | 14.17 | 24.46 | 48.21 | 97.3% |
| Comparative example 1 | 14.12 | 23.95 | 47.96 | 97.0% |
| Comparative example 2 | 13.92 | 18.02 | 45.23 | 76.5% |
| Comparative example 3 | 14.08 | 22.05 | 47.35 | 97.2% |
| Comparative example 4 | 14.10 | 22.11 | 47.32 | 97.0% |
| Group II ||||
| Example 2 | 14.42 | 27.11 | 50.03 | 97.1% |
| Comparative example 5 | 14.15 | 24.98 | 47.57 | 97.9% |
| Group III ||||
| Example 3 | 14.01 | 31.04 | 48.15 | 94.2% |
| Example 22 | 13.96 | 30.59 | 47.28 | 94.1% |
| Example 23 | 14.03 | 30.80 | 47.19 | 93.8% |
| Example 24 | 14.01 | 31.04 | 47.30 | 93.8% |
| Comparative example 6 | 13.92 | 29.96 | 46.98 | 92.3% |
| | | / | | |

Data analysis: for magnets with different brands, since the basic performances thereof are different, and the increase and decrease of performance after diffusion are different, they cannot be used to compare to obtain a pattern. Therefore, the examples and comparative examples with the same brand are compared. Examples 1, 4-21, 25-26 and comparative examples 1~4 are group I; example 2 and comparative example 5 are group II; example 3, examples 22-24 and comparative example 6 are group III.

It can be seen from the data in Table 1 that, in individual groups, the remanence (Br), coercivity (Hcj), maximum magnetic energy product ((BH) max) and squareness (Q) of the examples are all better than those of the comparative examples. In particular, the order of remanence (Br), coercivity (Hcj) and maximum magnetic energy product ((BH) max) in group I from poor to excellent is: comparative examples 1-4, examples 1 and 4-6, examples 25-26, examples 8-11 and 19, examples 12-14, examples 15-17, examples 18 and examples 20-21; and the order of squareness (Q) from poor to excellent is: comparative example 1 and comparative examples 3-4, examples 1-7, 22-26 and 8-21. Example 7 and comparative example 2 are large thickness products, which need to be compared separately.

In group I, example 1 and comparative example 1, as well as example 7 and comparative example 2 are compared with each other. Two blank magnets with a thickness of 6 mm in comparative example 1 are welded by conventional heating, and two blank magnets with a thickness of 12 mm in comparative example 2 are welded by the welding method in comparative example 1. It can be seen from the test results that, individual performances in example 1 are better than those in comparative example 1, and individual performances in example 7 are better than those in comparative example 2. On the one hand, it indicates that the primary heat treatment and secondary heat treatment adopted in this solution and the specific methods of the primary heat treatment can effectively improve the remanence (Br), coercivity (Hcj), maximum magnetic energy product ((BH) max) and squareness (Q). On the other hand, the magnet with a thickness of 12 mm can be treated by adopting this solution, and performance thereof can be improved to a certain extent.

In comparison, the squareness and coercivity of magnet in comparative example 2 are very low, indicating that the existing preparation method in comparative example 2 is not suitable for the welding of large thickness blank magnets.

Example 1 is compared with comparative examples 3-4. Primary heat treatment is omitted in comparative example 3, and that in comparative example 4 is replaced by high-temperature heat treatment at 700° C. for equal time. It can be seen from the test that, the four performances in comparative examples 3-4 are worse than those in example 1. The reason may be that the combination of primary heat treatment and secondary heat treatment in the technical solution and the refining of primary heat treatment improve the welding effect and the diffusion effect of heavy rare earth, and the two kinds of primary heat treatment methods can better concentrate the heating area near the magnet surface, so as to achieve the purpose of effectively heating the heavy rare earth containing layer.

In examples 1 and 4-6, the thickness of the blank magnets in examples 5-7 are changed on the basis of example 1. It can be seen from the test that, magnets in examples 5-6 can achieve the same level of performance as that in example 1. In addition, corresponding methods in example 7 and comparative example 2 are diffusion process for large thickness blank magnets of 12 mm. Example 7 has better magnet performance than comparative example 2, which shows that the technical solution has diffusion effect on large thickness blank magnets of 12 mm and improve the performance of the magnet. In addition, compared with examples 5-6, the increase in example 7 is smaller, and the increase is incremental due to its large thickness.

In examples 8-10, on the basis of example 1, a pressurization treatment is added in the secondary heat treatment process. It can be seen from the test that, the coercivity and remanence of the magnet can be improved in a small extent on the basis of improving the squareness in combination with pressurization. The reason may lie in that pressurization can better promote the further diffusion of heavy rare earth during the secondary heat treatment, so as to improve the diffusion effect of heavy rare earth containing layer.

In example 11, the pressurization treatment is added during primary heat treatment on the basis of example 1, which can effectively improve the diffusion efficiency of heavy rare earth on the basis of example 1, so as to improve the performance of magnets.

In examples 12-14, the pressurization treatment during the primary heat treatment is refined on the basis of example 9, which can stabilize and slightly improve the coercivity, remanence and squareness of the magnet. Moreover, in examples 12-14, the performances of examples 13-14 are better than that of example 12. On the one hand, it indicates that the pressurization treatment in the primary heat treatment can slightly improve the magnet performance, on the other hand, it indicates that the pressurization treatment in the later stage of the primary heat treatment can further effectively improve the magnet performance and reduce energy consumption at the same time.

In examples 15-17, the frequency of induction heat treatment is refined to 1.9-3 kHz on the basis of example 14. It can be seen from the test that the remanence, coercivity and squareness of the magnet can be improved on the basis of stabilizing the squareness. In example 18, the mode of induction heat treatment is refined to transverse flux heating on the basis of example 16, which further realizes the positive effect on the coercivity and remanence of the magnet on the basis of stabilizing the squareness. The possible reason is that both of the refining of induction heat treatment frequency and the transverse flux heating improve the diffusion effect of heavy rare earth. In example 19, the mode of transverse flux heating is refined on the basis of example 1, which also improves the performance of the magnet on the basis of example 1, and the improvement is smaller than that of examples 16-18. On the one hand, it indicates the positive effect of transverse flux heating on the magnet performance, on the other hand, it indicates that the combination of transverse flux heating, induction heat treatment frequency and pressurization treatment can achieve a better diffusion effect of heavy rare earth.

In examples 20-21, the temperature and time of secondary heat treatment are further refined on the basis of example 18. It achieves a positive effect on the coercivity, remanence and squareness of the magnet.

In group II, example 2 is compared with comparative example 5. The blank magnets of N54SH in comparative example 5 are welded by conventional heating. Individual performances of magnet in example 2 are better than those in comparative example 5, indicating that the primary heat treatment and secondary heat treatment adopted in this solution can effectively improve the performance of the magnet.

In group III, example 3 is compared with comparative example 6. The blank magnets of N50SH in comparative example 5 are welded by conventional heating. Individual performances of magnet in example 3 are better than those in comparative example 6, indicating that the primary heat treatment and secondary heat treatment adopted in this solution, and the mode of electric spark sintering adopted in primary heat treatment can effectively improve the performance of the magnet. In examples 22-24, the parameters of electric spark sintering are further refined on the basis of example 3, which slightly improves the performance of the magnets on the basis of stabilizing the squareness.

2. Welding Strength and Anti-Demagnetization Capability Test

Test object: the neodymium iron boron products obtained in examples 1-26 and comparative examples 1-4, a total of 30 groups of test samples.

Test method: four parallel samples were prepared for each group of test samples, three of which shall be tested for welding strength, and the remaining samples shall be tested for anti-demagnetization capability.

Welding strength test: the parallel samples were cut in the direction perpendicular to the heavy rare earth containing layer to a size of 12 mm length*2 mm width*2 mm height, of which the heavy rare earth containing layer in the middle was included in the 12 mm. The test was carried out on the universal material testing machine, in which the bending test fixture was installed on the workbench, and the spacing between the two pressure rollers was adjusted to 6 mm; and the bending punch was installed at the lower end of the moving beam, and the bending punch was kept parallel to the two pressing rollers and located between the two pressing rollers. Two ends of the parallel sample were placed on two pressing rollers, and the heavy rare earth containing layer was directly below the punch. The oil delivery valve was opened to start loading. After the sample being damaged, the oil delivery valve was closed and the shear strength (MPa) test data was recorded as the welding strength value.

Anti-demagnetization capability test: examples 1, 4-21, 25-26 and comparative examples 1-4 were recorded as group I; example 2 and comparative example 5 were recorded as group II; example 3, examples 22-24 and comparative example 6 were recorded as group III. The samples with the same brand were divided into the same group for comparison.

The magnetic fluxes of the samples in individual groups were first tested to obtain the original magnetic fluxes, the samples were placed in the oven at 160° C. for 2 h, then taken out and cooled to room temperature, the magnetic fluxes of the parallel samples were tested to obtain the final magnetic fluxes, and the flux loss (%)=[(original magnetic flux—final magnetic flux)/original magnetic flux]*100%.

Test results: the test result records of welding strength and anti-demagnetization capability test were shown in Table 2.

TABLE 2

Test result records of welding strength and anti-demagnetization capability

| group | welding strength (MPa) | flux loss (%) |
|---|---|---|
| Group I | | |
| Example 1 | 297.2 | 3.5% |
| Example 4 | 299.4 | 3.5% |
| Example 5 | / | 3.6% |
| Example 6 | 298.3 | 3.8% |
| Example 7 | 295.6 | 41.1% |
| Example 8 | 301.2 | 3.3% |
| Example 9 | 302.8 | 3.2% |
| Example 10 | 301.2 | 3.2% |
| Example 11 | 303.5 | 3.3% |
| Example 12 | 306.8 | 3.3% |
| Example 13 | 308.2 | 3.1% |
| Example 14 | 308.8 | 3.2% |
| Example 15 | 311.1 | 1.6% |
| Example 16 | 312.4 | 1.7% |
| Example 17 | 310.8 | 1.5% |
| Example 18 | 315.2 | 0.6% |
| Example 19 | 302.9 | 3.1% |
| Example 20 | 313.6 | 0.7% |
| Example 21 | 315.7 | 0.6% |
| Example 25 | / | 3.6% |
| Example 26 | 298.0 | 3.4% |
| Comparative example 1 | 12.6 | 4.2% |
| Comparative example 2 | 9.2 | 45.3% |
| Comparative example 3 | 10.5 | 19.8% |
| Comparative example 4 | 11.5 | 18.4% |
| Group II | | |
| Example 2 | 305.3 | 1.8% |
| Comparative example 5 | 292.1 | 2.8% |
| Group II | | |
| Example 3 | 301.0 | 2.7% |
| Example 22 | 312.4 | 2.6% |
| Example 23 | 312.1 | 2.5% |
| Example 24 | 311.8 | 2.5% |
| Comparative example 6 | 289.8 | 3.7% |

Data analysis: the greater the shear strength is, the greater the force required to disconnect the weld is, indicating that the better the welding effect; and the smaller the flux loss is, the smaller the magnetic flux loss is, and the better the anti-demagnetization capability is.

It can be seen from the data in Table 2 that, in group I, the ascending order of welding strength and anti-demagnetization capability is: example 18 and examples 20-21; examples 15-17; examples 12-14; examples 8-11 and example 19; example 1 and examples 4-7 and example 25-26; comparative example 1 and comparative examples 3-4. Example 7 and comparative example 2 are compared separately.

Example 1 is compared with comparative examples 1-4. The conventional heating treatment is used in comparative examples 1~4 to realize grain boundary diffusion and welding, and in contrast, the methods of primary heat treatment and secondary heat treatment are adopted in example 1, in which the primary heat treatment is refined to induction heat treatment, and the electric spark sintering is adopted in example 3, thereby greatly improving the anti-demagnetization capability of the magnets. In addition, the welding strength between magnets is also greatly improved.

In addition, it can be seen from the data of examples 4-6 and the comparison between the data of comparative example 2 and example 7 that, after welding the blank magnet with a thickness of 0.2-12 mm, the anti-demagnetization capability and welding strength can also be improved. The reasons may lie in that: the diffusion efficiency of heavy rare earth is improved, such that the heavy rare earth containing layer goes deeper into the interior of the magnet, which improves the overall anti-demagnetization capability of the magnets, and, at the same time, achieves full diffusion effect. Although the conventional heat treatment is adopted in comparative example 2 for the large thickness blank magnets, the welding strength and anti-demagnetization capability are very poor, which indicates that this technical solution can effectively realize the diffusion welding of large thickness magnets.

In examples 8-10, a pressurization treatment is added in the secondary heat treatment process on the basis of example 1; and in example 11, the pressurization treatment is added during primary heat treatment on the basis of example 1, both of which improve the anti-demagnetization capability and welding strength of the magnets. The reason may be that, under the action of pressure, the blank magnets are tightly bonded and the heavy rare earth containing layer is more dense, which improves the diffusion efficiency of heavy rare earth, makes the heavy rare earth atoms go deeper into the interior of the magnet and achieves the effect of full diffusion.

In examples 12-14, the pressurization treatment is added in the primary heat treatment on the basis of example 9, which further improves the welding strength of the magnets; and examples 13-14 achieve better effect; indicating that pressurization treatment in the later stage of primary heat treatment can further improve the diffusion effect of heavy rare earth in a single magnet product and improve the internal performance of it, so as to improve the overall anti-demagnetization capability and reduce energy consumption at the same time.

In examples 15-17, the induction heat treatment frequencies are refined on the basis of example 14, which further improves the welding effect and anti-demagnetization capability. It indicates that the frequency of induction heat treatment can directly affect the diffusion effect, thus affecting the magnet welding effect and the final performance of the product.

In example 18, the transverse flux heating is added on the basis of example 16. Combined with the medium frequency, it achieves a better heating effect on the magnet with a small thickness and improves the uniformity of surface heating, so as to promote the diffusion of heavy rare earth into the interior of magnet and improve the anti-demagnetization capability of the magnet. In example 19, the transverse flux heating is added on the basis of example 1, which achieves a better anti-demagnetization capability than example 1.

In group II, example 2 is compared with comparative example 5. In comparative example 5, conventional heating is used to weld the blank magnet of N54SH. The welding strength and anti-demagnetization capability of example 2 are better than those of comparative example 5, indicating that the primary heat treatment and secondary heat treatment adopted in this solution can effectively improve the welding strength and anti-demagnetization capability.

In group III, example 3 is compared with comparative example 6. In comparative example 5, conventional heating is used to weld the blank magnet of N50SH. Each performance in example 3 is better than that in comparative example 6, indicating that the primary heat treatment and secondary heat treatment adopted in this solution, and the refining of the primary heat treatment to electric spark sintering, can effectively improve the welding strength and anti-demagnetization capability. In examples 22-24, the parameters of electric spark sintering are further refined on the basis of example 3, which slightly improves the performance of the magnet on the basis of stabilizing the anti-demagnetization capability.

The specific examples are only interpretation of the present application and not a limitation of the same. After reading the specification, those skilled in the art can make modifications to the examples without creative contribution as needed, but they are protected by the patent law as long as they are within the scope of the claims of the present application.

What is claimed is:

1. A preparation method of neodymium iron boron products, comprising the following steps:
    Step S1: preparing blank magnet;
    Step S2: obtaining preprocessed sheets: forming at least one group of welding surface from two opposite sides of the blank magnets, wherein the side of the blank magnet acts as a welding surface, and the distance between two welding surfaces in each group of welding surface is 0.2-12 mm; and magnetizing the blank magnet in a direction forming an angle relative to the welding surface to obtain the preprocessed sheets;
    Step S3: surface treating: cleaning the preprocessed sheets;
    Step S4: heavy rare earth coating: after surface treating, coating a heavy rare earth containing layer on the welding surface of the preprocessed sheet, wherein the heavy rare earth containing layer is one selected from the group consisting of heavy rare earth metals, heavy rare earth alloys and heavy rare earth compounds;
    Step S5: stacking: stacking a plurality of preprocessed sheets to give stacked magnets, wherein there is at least one heavy rare earth containing layer between adjacent preprocessed sheets; and
    Step S6: grain boundary diffusion: successively subjecting the stacked magnets to a primary heat treatment for 2-40 min, a secondary heat treatment at 700-1000° C. for 4-40 h, and then tempering at 450-700° C.;
    wherein, in Step S6, the heating mode of stacked magnets is transverse flux heating during the primary heat treatment.

2. The preparation method of neodymium iron boron products according to claim 1, wherein, in Step S6, the stacked magnet is subjected to the secondary heat treatment under a pressure of 2-50 MPa.

3. The preparation method of neodymium iron boron products according to claim 1, wherein, in Step S6, a later stage of the primary heat treatment accounting for 10-50% of the total time of the primary heat treatment is carried out under a pressure of 2-50 MPa.

4. The preparation method of neodymium iron boron products according to claim 2, wherein, in Step S6, the stacked magnet is subjected to the secondary heat treatment under a pressure of 2-30 MPa.

5. The preparation method of neodymium iron boron products according to claim 3, wherein, in Step S6, the stacked magnet is subjected to the secondary heat treatment under a pressure of 2-30 MPa.

6. The preparation method of neodymium iron boron products according to claim 1, wherein, a frequency for transverse flux heating is 1.9-3 kHz.

7. The preparation method of neodymium iron boron products according to claim 1, wherein, in Step S2, the area of a single welding surface of the blank magnet is 0.3-4000 mm$^2$.

8. The preparation method of neodymium iron boron products according to claim 1, wherein, in Step S6, the temperature of the secondary heat treatment is 820-1000° C. and the tempering temperature is 480-600° C.

* * * * *